US012618746B2

(12) United States Patent
Kakosimos et al.

(10) Patent No.: US 12,618,746 B2
(45) Date of Patent: May 5, 2026

(54) METHOD OF EXTENDING THE LIFETIME OF A ROLLING ELEMENT BEARING

(71) Applicant: ABB Schweiz AG, Baden (CH)

(72) Inventors: Panagiotis Kakosimos, Västerås (SE); Ingo Stroka, Västerås (SE); Dmitry Svechkarenko, Stockholm (SE)

(73) Assignee: ABB Schweiz AG, Baden (CH)

( * ) Notice: Subject to any disclaimer, the term of this patent is extended or adjusted under 35 U.S.C. 154(b) by 476 days.

(21) Appl. No.: 18/248,966

(22) PCT Filed: Oct. 20, 2021

(86) PCT No.: PCT/EP2021/079075
§ 371 (c)(1),
(2) Date: Apr. 13, 2023

(87) PCT Pub. No.: WO2022/084384
PCT Pub. Date: Apr. 28, 2022

(65) Prior Publication Data
US 2023/0393023 A1 Dec. 7, 2023

(30) Foreign Application Priority Data

Oct. 22, 2020 (EP) .................................... 20203392

(51) Int. Cl.
*G01M 13/045* (2019.01)
(52) U.S. Cl.
CPC ................................. *G01M 13/045* (2013.01)
(58) Field of Classification Search
None
See application file for complete search history.

(56) References Cited

U.S. PATENT DOCUMENTS

| | | | |
|---|---|---|---|
| 6,326,758 B1 | 12/2001 | Discenzo |
| 2019/0154548 A1 | 5/2019 | Lai et al. |

FOREIGN PATENT DOCUMENTS

| | | | |
|---|---|---|---|
| DE | 102019201412 A1 | 8/2019 |
| EP | 1913506 A2 | 4/2008 |

(Continued)

OTHER PUBLICATIONS

Medjaher, Kamal, Diego Alejandro Tobon-Mejia, and Noureddine Zerhouni. "Remaining useful life estimation of critical components with application to bearings." IEEE Transactions on Reliability 61.2 (2012): 292-302. (Year: 2012).*

(Continued)

*Primary Examiner* — Carlos R Ortiz Rodriguez
(74) *Attorney, Agent, or Firm* — Whitmyer IP Group LLC

(57) ABSTRACT

A method of extending the lifetime of a rolling-element bearing of an electrical machine, the method including: a) defining a first set of control parameter values, b) estimating a first remaining useful life, RUL, of the rolling-element bearing, based on a signal that provides a measure of vibrations of the rolling-element bearing obtained when the electrical machine is controlled by the first set of control parameter values, c) changing at least one control parameter value in the first set of control parameter values to thereby obtain a second set of control parameter values, d) estimating a second RUL of the rolling-element bearing based on the signal, obtained when the electrical machine is controlled by the second set of control parameter values, e) comparing the first RUL with the second RUL, f) in case the second RUL is longer than the first RUL, replacing the control parameter values in the first set of control parameter values with those of the second set of control parameter values, and replacing the value of the first RUL with that of (Continued)

the second RUL, and g) repeating steps c)-f) over and over during operation of the electrical machine.

15 Claims, 2 Drawing Sheets

(56)                    References Cited

FOREIGN PATENT DOCUMENTS

| | | | |
|---|---|---|---|
| EP | 3414453 | A1 | 12/2018 |
| WO | 03054503 | A2 | 7/2003 |
| WO | 2017137050 | A1 | 8/2017 |

OTHER PUBLICATIONS

Singleton, Rodney K., Elias G. Strangas, and Selin Aviyente. "Extended Kalman filtering for remaining-useful-life estimation of bearings." IEEE Transactions on Industrial Electronics 62.3 (2014): 1781-1790. (Year: 2014).*

Li, Bo, et al. "Neural-network-based motor rolling bearing fault diagnosis." IEEE transactions on industrial electronics 47.5 (2002): 1060-1069. (Year: 2002).*

Extended European Search Report; Application No. 20203392.1; Completed: Mar. 22, 2021; Issued: Mar. 30, 2021; 8 Pages.

PCT International Search Report and Written Opinion of the International Searching Authority; Application No. PCT/EP2021/079075; Completed: Jan. 14, 2022; Mailing Date: Jan. 24, 2022; 14 Pages.

* cited by examiner

METHOD OF EXTENDING THE LIFETIME OF A ROLLING ELEMENT BEARING

TECHNICAL FIELD

The present disclosure generally relates to rolling-element bearings used in electrical machines.

BACKGROUND

Electric motors are a key component that enables modern, efficient production. For a company to globally stay competitive its motors should be running 24/7.

More than half of the breakdowns of electrical motors are due to failures of the bearings.

The improper handling of the bearing during its life is the main reason for its early failure.

In academia and industry, many researchers focus on how to detect the incipient bearing faults. It is understood that the failure types are numerous and very complicated to be identified due to their stochastic nature. Therefore, artificial intelligence algorithms are usually employed. However, detecting a bearing failure only brings the benefit of planning the bearing replacement in the next maintenance period.

U.S. Pat. No. 6,326,758 discloses a model-based diagnostic approach along with qualitative/casual model information. The aim is to monitor the health condition and then act upon detecting an imminent failure. The goal is to change the control parameters and verify that the system can operate reliably until the next planned maintenance. The method involves a health assessment technique that evaluates the machine condition. A health indication is then given to the controller where a model of the overall system is determined. Finally, a multi-objective optimization method is involved to optimize the system performance. Different kinds of parameters are given as inputs to the optimization routine, e.g., control parameters, operating conditions, etc. The final goal is to act in the control system before imminent failures render it inoperable.

SUMMARY

A general object of the present disclosure is to provide a method that solves or at least mitigates the problems of the prior art.

There is hence according to a first aspect of the present disclosure provided a method of extending the lifetime of a rolling-element bearing of an electrical machine, the method comprising: a) defining a first set of control parameter values, b) estimating a first remaining useful life, RUL, of the rolling-element bearing, based on a signal that provides a measure of vibrations of the rolling-element bearing obtained when the electrical machine is controlled by the first set of control parameter values, c) changing at least one control parameter value in the first set of control parameter values to thereby obtain a second set of control parameter values, d) estimating a second RUL of the rolling-element bearing based on the signal, obtained when the electrical machine is controlled by the second set of control parameter values, e) comparing the first RUL with the second RUL, f) in case the second RUL is longer than the first RUL, replacing the control parameter values in the first set of control parameter values with those of the second set of control parameter values, and replacing the value of the first RUL with that of the second RUL, and g) repeating steps c)-f) over and over during operation of the electrical machine.

By this iterative method, the lifetime of the rolling-element bearing may be extended without the need of an optimisation routine. The optimisation routine disclosed in U.S. Pat. No. 6,326,758 requires the existence of a model. If not available a signal has to be injected, the system response must be analysed, and a transfer function (stimulus response) has to be calculated. Then, the transfer function is considered in the optimization function.

For the present method, only the direction of the trend of the RUL estimation is needed to draw a conclusion about the impact of the change of the control parameter value.

This also allows the implementation to be realized with minimum hardware resources.

Further, according to U.S. Pat. No. 6,326,758 the optimality of the solution relies on the selected optimization function and its members. The application constraints are also put in the optimization routine, so the result is always optimal. Nevertheless, this requirement renders the method not easily implementable in practice. According to the present method, the power converter/drive may perform actions and make decisions similar to those of a human, so they have justifiable benefits, and safety issues are not raised. On the other hand, if any member of the optimization function in U.S. Pat. No. 6,326,758 is erroneous, the system will fail.

The RUL is the amount of time that a group of apparently identical bearings will complete or exceed before the formation of a fatigue spall.

The estimation of the first and second RUL may preferably be performed during steady-state conditions. This is because the estimation of the RUL is complex and takes time and may otherwise be affected by load or speed transients.

The method may in step c) involve changing the at least one control parameter value stepwise in each iteration. The present method may thus be search based. The stepwise change may be performed in increments or decrements.

In case the second RUL is longer than the first RUL, the same at least one control parameter value that was changed in current step c) may be changed in step c) in the next iteration.

In case the second RUL is shorter than the first RUL, at least one control parameter value that was not changed in the current iteration of step c) may be changed in the next iteration of step c). Control parameter values that were not changed in the current iteration may be changed in the next iteration as long as there are new combinations of control parameters available.

The signal may come from any sensor whose processed or unprocessed output can be directly associated with the level of the mechanical vibrations. The signal may for example be a vibration signal or a current signal. For current signals, the harmonic content increases in the case of mechanical failures. Observing the amplitude changes of certain harmonics can provide information about the vibrations. The sensor may for example be one or more accelerometers such as triaxial accelerometers, current transducers, one or more Smart Sensors such as the ABB Ability™ Smart Sensor, or one or more capacitive sensors.

The control parameter may for example be a torque reference, a speed reference, a switching frequency or modulation. The switching frequency is the frequency of switching semiconductors in a power converter configured to control the electrical machine. The switching frequency is the frequency of the carrier signal of the pulse width modulation. The carrier signal may be a triangular wave. The modulation is for the modulation signal, also used for the pulse width modulation. The modulation signal may be a sinusoidal wave but could according to some examples have a shape that changes. Thus, the modulation of the modulation signal may according to one example be a control parameter.

Step c) may involve controlling a power converter that controls the electrical machine, by means of the second set of control parameter values.

According to one embodiment the estimating involves using a degradation model of the rolling-element bearing, using an Extended Kalman $3o$ Filter or using neural networks.

Steps b) and d) of estimating may be performed using model-based prognostics or data-driven prognostics.

In the model-based prognostics approach, the rolling-element bearing, and its degradation phenomenon are represented by a set of mathematical laws used to estimate the RUL. The mathematical law/model may for example be the $L_{10}$ prediction model.

In the data-driven prognostics approach, sensor signals are in a learning phase transformed into a reliable behavioural model of the degradation. This behavioural model is the degradation model. Features extracted from the sensor signals during the learning phase are used to obtain the degradation model. The degradation model may then be used in the exploitation phase, i.e. on-line with the signal mentioned in step a), or using features extracted from the signal, as an input to the degradation model.

According to one embodiment step f) involves replacing the control parameter values in the first set of control parameter values only in case the second RUL deviates with more than a threshold value from the first RUL. In this way the electrical machine will less often be perturbed by means of control action in step c).

One embodiment comprises, prior to step c): A) determining a harmonic content of the signal, B) changing at least one control parameter value in a third set of control parameter values in case an amplitude higher than a threshold value is present in the harmonic content, and C) repeating steps A)-B) until a set of third control parameter values that causes the amplitude to decrease to a value below the threshold value has been found; and D) performing steps c-g), wherein the at least one control parameter value that is changed in step c) is of that at least one control parameter that is associated with the at least one control parameter value used in step B), and wherein the change of the at least one control parameter value in step B) is smaller than the change in step c).

Steps A) to C) takes care of dynamic conditions of the electrical machine.

Further, steps A) to C) perform a sort of reconnaissance of how to change the control to increase the lifetime of the rolling-element bearing. The estimation of the RUL is a complicated task, and therefore more time-consuming than the processing in steps A)-C). Step c) will thereafter make a larger change to the one or more control parameters found by performing steps A) to C). The changing performed in step c) may be large enough to change the operating point of the electrical machine. The changing performed in step B) may preferably be so small that it does not change the operating point of the electrical machine.

Step B) may involve comparing the amplitude of the harmonic content with the corresponding amplitude of a previously obtained harmonic content of the signal, and in case the amplitude has decreased compared to the corresponding amplitude and is below the threshold value, step D) is performed.

According to one embodiment the changing of the at least one control parameter value in step B) is performed stepwise in each iteration.

The stepwise change in step B) may be performed in increments or decrements.

According to one embodiment the changing in step c) is based on the at least one control parameter value selected in step B). In step c) the change of the control parameter value may be a stepwise change from the control parameter value selected in the last execution of step B).

According to one embodiment in initial iterations of step B) the control parameter value of an individual control parameter is changed, and in later iterations when changes to all individual control parameters have been performed, combinations of control parameter values of control parameters are changed. Thus, in initial iterations of step B) the control parameter value of only a single control parameter is changed, whereas when/if all control parameters have been tested individually in different iterations, changes to control parameter values of combinations of several control parameters will be performed.

According to one embodiment steps A)-C) form an inner control loop and steps c)-g) form an outer control loop. The inner control loop and the outer control loop may run independently from each other. The outer control loop however sometimes receives information about changing the value of a certain control parameter from the inner control loop.

The inner control loop may be a high-speed control loop compared to the outer control loop.

There is according to a second aspect of the present disclosure provided a computer program comprising computer code which when executed by processing circuitry of a control system causes the control system to perform the steps of the method of the first aspect.

There is according to a third aspect of the present disclosure provided a control system for extending the lifetime of a rolling-element bearing of an electrical machine, the control system comprising: a storage medium comprising a computer code, and processing circuitry, wherein when the processing circuitry executes the computer code, the control system is configured to: a) define a first set of control parameter values, b) estimate a first remaining useful life, RUL, of the rolling-element bearing, based on a signal that provides a measure of vibrations of the rolling-element bearing obtained when the electrical machine is controlled by the first set of control parameter values, c) change at least one control parameter value in the first set of control parameter values to thereby obtain a second set of control parameter values, d) estimate a second RUL of the rolling-element bearing based on the signal, obtained when the electrical machine is controlled by the second set of control parameter values, e) compare the first RUL with the second RUL, f) in case the second RUL is longer than the first RUL, replace the control parameter values in the first set of control parameter values with those of the second set of control parameter values, and replace the value of the first RUL with that of the second RUL, and g) repeat steps c)-f) over and over during operation of the electrical machine.

According to one embodiment the processing circuitry is configured to estimate the first and second RUL using a degradation model of the rolling-element bearing or using an Extended Kalman Filter.

According to one embodiment the processing circuitry is configured to, prior to steps c)): A) determine a harmonic content of the signal, B) change at least one control parameter value in a third set of control parameter values in case an amplitude higher than a threshold value is present in the harmonic content, and C) repeat steps A)-B) until a set of third control parameter values that causes the amplitude to decrease to a value below the threshold value has been found; and D) perform steps c-g), wherein the at least one control parameter value that is changed in step c) is of that at least one control parameter that is associated with the at least one control parameter value used in step B), and wherein the change of the at least one control parameter value in step B) is smaller than the change in step c).

According to one embodiment the processing circuitry is configured to change the at least one control parameter value in step B) stepwise in each iteration.

According to one embodiment the processing circuitry is configured to perform the change in step c) based on the at least one control parameter value selected in step B).

According to one embodiment the processing circuitry is configured to change the control parameter value of an individual control parameter in initial iterations of step B), and in later iterations when changes to all individual control parameters have been performed, to change combinations of control parameter values of control parameters.

The processing circuitry may be configured to change the at least one control parameter value in step c) in case the second RUL deviates with more than a threshold value from the first RUL.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
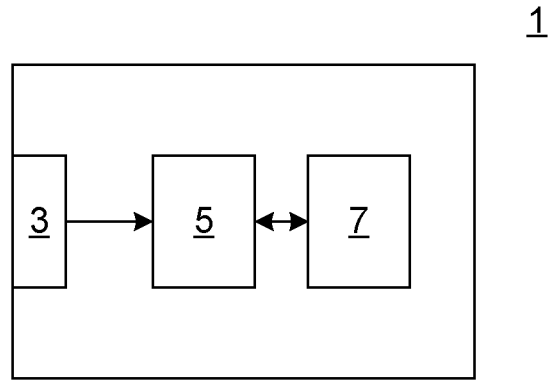
FIG. 1 diagrammatically shows an example of a control system for extending the lifetime of a rolling-element bearing.

FIG. 1 depicts a block diagram of an example of a control system 1. The control system 1 is configured to control a power converter that controls an electrical machine. The control system 1 is configured to control the power converter in such a manner as to extend the lifetime of the rolling-element bearings of the electrical machine.

The control system 1 comprises an input unit 3 configured to receive a signal from one or more sensors. The signal provides a measure of vibrations of the rolling-element bearing. The one or more sensors may for example be accelerometers configured to detect mechanical vibrations in the rolling-element bearings, current transducers configured to measure the phase currents of the electrical machine, or one or more Smart Sensors measuring mechanical vibrations or Key Performance Indicators (KPI), or capacitive sensors configured to detect radial displacement of the rolling-element bearings.

The control system 1 comprises processing circuitry 5 and may comprise a storage medium 7.

The storage medium 7 may comprise a computer program which when executed by the processing circuitry 7 causes the control system 1 to perform the method as disclosed herein.

The processing circuitry 5 may for example use any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed operations concerning electrical machine control.

The storage medium 7 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

Figure 2:
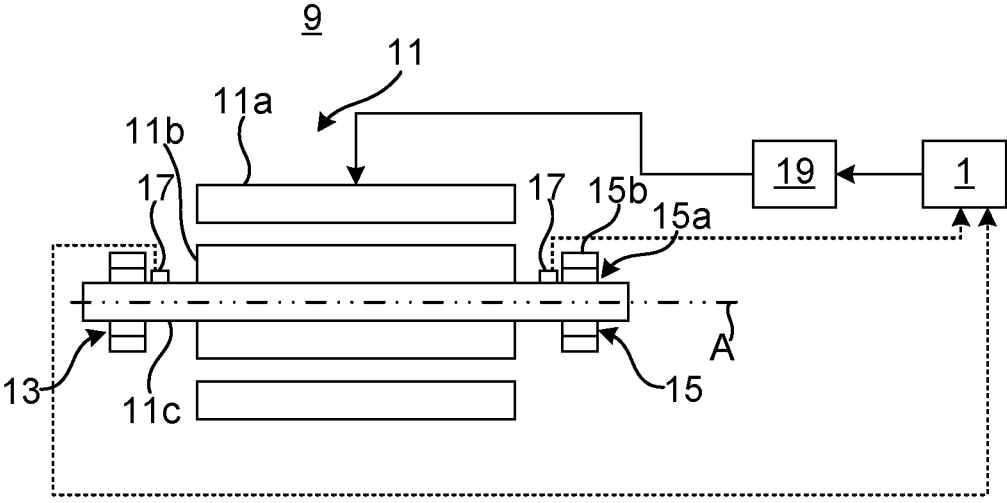
FIG. 2 schematically shows a machine assembly including an electrical machine and the control system in FIG. 1.

FIG. 2 shows an example of a machine assembly 9. The machine assembly 9 comprises an electrical machine 11. The electrical machine 11 is a rotating electrical machine. The electrical machine 11 may be a motor or a generator. The electrical machine 11 is shown in a longitudinal section in FIG. 2.

The electrical machine 11 comprises a stator 11a and a rotor 11b. The stator 11a and the rotor 11b are configured to electromagnetically interact with each other. The rotor 11b comprises a shaft 11c. The shaft 11c is rotatable about a longitudinal shaft axis A.

The electrical machine 11 comprises rolling-element bearings 13 and attached to the shaft 11c. The rolling-element bearings 13 and 15 enable rotation of the shaft 11c.

The rolling element bearing 15 has an inner bearing race 15a attached to the shaft 11c. The bearing 15 has an outer bearing race 15b attached to a support structure (not shown) which supports the rotor 11b. The rolling element bearing 13 is similar or identical to the rolling-element bearing 15.

The machine assembly 9 also comprises one or more sensors 17. The one or more sensors 17 may for example be accelerometers, current transducers, or capacitive sensors. In case the sensors 17 are accelerometers, they generate signals that provide a measure of the mechanical vibrations in the rolling-element bearings 13 and 15. In case the sensors 17 are capacitive sensors, they may be arranged around the shaft 11c to measure radial displacement of the shaft 11c and generate a signal. In the example in FIG. 2, the sensors 17 are either accelerometers or capacitive sensors, since they are placed on or around the shaft 11c. In case the sensors are current transducers, they may be arranged to measure the phase current(s) and generate a signal.

The machine assembly 9 comprises the control system 1. The machine assembly 9 comprises a power converter 19. The power converter 19 may be a drive. The power converter 19 is configured to control the operation of the electrical machine 11. The control system 1 is configured to control the operation of the power converter 19.

The control system 1 is configured to receive the signal(s) from the one or more sensors 17. The control system 1 is configured to process the signal(s) and to control the power converter 19 and thus the electrical machine 11 based on the signal(s) in a manner that extends the lifetime of the rolling-element bearings 13 and 15. This operation will be described with reference to FIGS. 3 and 4.

Figure 3:
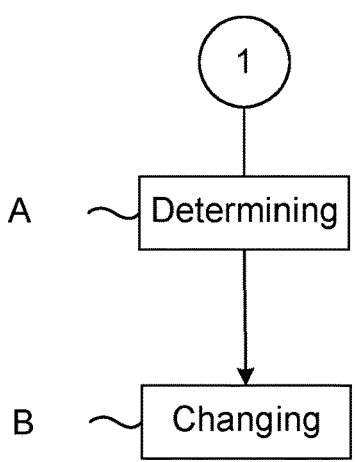
FIG. 3 shows a flowchart of an inner control loop.
Figure 4:
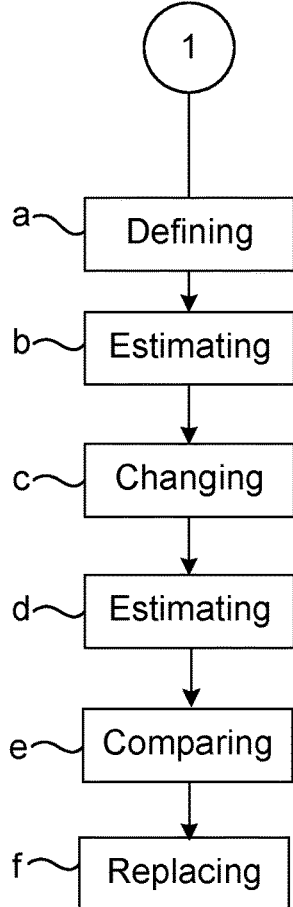
FIG. 4 shows a flowchart of an outer control loop.

FIG. 3 shows a flowchart that describes an example of an inner control loop, executed by the control system 1. FIG. 4 shows a flowchart that describes an example of an outer control loop, executed by the control system 1. The outer control loop may receive an output from the inner control loop as an input, but the inner and outer control loops may also be executed independently.

As shown in FIG. 4, the method comprises a step a) in which a first set of control parameters are defined. This may be a set of control parameter values selected for controlling the electrical machine.

The method moreover comprises a step b) of estimating a first RUL of the rolling-element bearing 13, 15 based on the signal received from the one or more sensors 17. The signal obtained from the sensors was measured when the electrical machine was controlled using the first set of control parameter values.

Features may be extracted from the signal, which may be used for estimating the RUL.

According to one example, methods disclosed in the paper "Remaining Useful Life Estimation of Critical Components With applications to Bearings" by Medjaher et al, published in IEEE Transactions on Reliability, Vol 61, No. 2, June 2012 may be used for estimating the RUL.

Alternatively, a mathematical model such as an $L_{10}$ prediction model may be used for estimating the RUL.

The RUL may for example be estimated using a degradation model of the rolling-element bearing, using an Extended Kalman Filter or using neural networks.

With reference to FIG. 3, the inner control loop comprises receiving a signal from the one or more sensors 17. The signal provides a measure of vibrations of the rolling-element bearing 13, 15.

In a step A) the harmonic content of the signal is determined. This may be done using a frequency transform such as one from the family of Fourier transforms.

In case it is determined that an amplitude of the harmonic content is higher than a threshold, in a step B) a control parameter value of at least one control parameter from a set of control parameters is changed. This set is herein also referred to as a "third set of control parameter values".

An amplitude above the threshold value gives an indication that higher vibrations than what is desirable are present in the rolling-element bearing 13, 15.

Step a) may be performed before steps A)-B). The first set of control parameter values may for example be used as the set of control parameter values in the first iteration of steps A)-B).

Step b) may be performed before steps A)-B).

In a step C) steps A) and B) are repeated until a set of control parameter values that causes the amplitude to decrease to a value below the threshold value has been found.

In every iteration at least one control parameter value is changed stepwise. In case the amplitude decreases, the same at least one control parameter will be subjected to a control parameter value change. If the amplitude increases at least one different control parameter will have its control parameter value changed.

In initial iterations of step B) only one control parameter value is changed. In later iterations, when changes to all individual control parameters have been performed and the amplitude is higher than the threshold value, combinations of control parameter values of several or even all control parameters are changed.

The control parameter value or values that is/are being changed in step B) is/are for controlling the power converter 19. The control system 1 thus changes the one or more control parameter values to obtain a new set of control parameters for controlling the power converter 19, which in turn controls the electrical machine 11. The control parameter may for example be a torque reference, a speed reference, a switching frequency or modulation.

When the above-described steps A)-B) have been performed and a set of control parameter values, causing the amplitude to fall below the threshold value has been found, the following steps may be performed in the outer control loop.

In a step c) the at least one control parameter value that was changed in the last iteration of step B) is changed in the first set of control parameter values. A second set of control parameter values is thereby obtained. The at least one control parameter value is changed with a larger increment or decrement than in step B). The direction of change, i.e. increment or decrement, is the same as in step B).

The electrical machine 11 is then controlled using the second set of control parameter values. The control system 1 thus uses the second set of control parameter values for controlling the power converter 19, which in turn controls the electrical machine 11. The control parameter may for example be a torque reference, a speed reference, a switching frequency or modulation.

In a step d) a second RUL is estimated based on the signal, obtained when the electrical machine is controlled using second set of control parameter values.

In a step e) the first RUL is compared with the second RUL.

In a step f), in case the second RUL is longer than the first RUL, the control parameter values in the first set of control parameter values is replaced with those of the second set of control parameter values. The value of the first RUL is replaced with that of the second RUL.

Step f) may according to one example involve replacing the control parameter values in the first set of control parameter values with those of the second set of control parameter value only if the second RUL is longer than the first RUL and the second RUL deviates with more than a threshold value from the second RUL. In case the second RUL deviates with less than a threshold value, the first set of control parameter values may be used for controlling the electrical machine 11 because in this case, according to one example the improvements in RUL is small enough not to make much difference in view of the invasive character of the method.

Steps a)-g) may according to one variation be performed without involvement of steps A)-C). Thus, the steps referred to as an outer control loop herein may be performed on their own i.e. as an independent method. In case steps c)-g) follow steps A)-B) described above, the control parameter value or values selected in the last iteration of step B) is/are used as the start value(s) that is/are being changed in step c). The change in step c) is larger than the change performed in step B).

Steps a)-g) are repeated over and over during operation of the electrical machine.

The lifetime of the rolling-element bearing may thereby be extended.

The inner control loop is faster than the outer control loop. Thus, while the outer control loop is performing steps c)-f), the inner control loop continues performing steps A)-C). The inner control loop and the outer control loop operate in independently. For example, let us assume that for a first set of control parameter values, a first RUL with a value of 50 000 hours is estimated in step b). The inner control loop is then operated. In this case, the outer control loop does not operate. Steps A) and B) are performed and repeated. For example, the control parameter value that may be changed in step B) is the speed reference. In the first iteration of this inner control loop the speed reference may be 1500 revolutions per minute (RPM) for example, and in each iteration the speed reference is increased with 10 RPM. Thus, in the second iteration, the speed reference is 1510 RPM, then 1520 RPM in the third iteration and so on. Assume that steps A) and B) are repeated, changing one or more control parameter values in steps, until the amplitude in the harmonic content is below the threshold value. The steps are small and may only be increased to a certain point so they do not change the operating point of the electrical machine 11. In this case we assume as an illustrative example that the speed reference is 1550 RPM when the amplitude in the harmonic content reaches below the threshold value. The process of running the inner control loop may take a time in the order of minutes. In this case, in step c) the control parameter value of the control parameter associated with the speed reference is changed, and thus the second set of control parameter values is obtained. This change may for example be by 100, so the speed reference is changed to 1650 in step c). The operating point of the electrical machine 11 may thereby change. In step d) the second RUL is estimated based on the speed reference of 1650 RPM. Assume that the second RUL turns out to be 51 000 hours. If improvement occurs, the change in RUL may be 3-5% for a step change of one or more control parameter values. In this case, the control parameter values in the first set of control parameter values is replaced with those of the second set of control parameters. Moreover, the value of the first RUL, 50 000 hours, is replaced with that of the second RUL of 51 000 hours. The outer control loop may continue changing the control parameters in the larger steps of 100, and all changes may be completed in a time in the order of hours.

In case the second RUL would have been shorter than the first RUL, for example 49 000 hours, then the outer control loop will change another control parameter value than the speed reference, independently of the inner control loop which at this time is not running. Once the outer control loop has finished running, the inner control loop may again iteratively perform steps A)-C) to find a new set of control parameter values that decrease the vibrations in the electrical machine. For every set of second control parameter values used in the outer control loop the corresponding RUL may be stored together with the second set of control parameter values. When all control parameter value combinations have been exhausted, the set of control parameters which gave the longest RUL may be selected for controlling the electrical machine 11.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method of extending the lifetime of a rolling-element bearing of an electrical machine, the method comprising:
a) defining a first set of control parameter values,
b) estimating a first value of remaining useful life, RUL, of the rolling-element bearing, based on a signal that provides a measure of vibrations of the rolling-element bearing obtained when the electrical machine is controlled by the first set of control parameter values,
c) changing at least one control parameter value in the first set of control parameter values to thereby obtain a second set of control parameter values,
d) estimating a second value of RUL of the rolling-element bearing based on the signal, obtained when the electrical machine is controlled by the second set of control parameter values,
e) comparing the first value of RUL with the second value of RUL,
f) in case the second value of RUL is longer than the first value of RUL, replacing the control parameter values in the first set of control parameter values with those of the second set of control parameter values, and replacing the first value of RUL with the second value of RUL, and
g) repeating steps c)-f) during operation of the electrical machine.

2. The method as claimed in claim 1, wherein the estimating in steps b) and d) involves using a degradation model of the rolling-element bearing, using an Extended Kalman Filter or using neural networks.

3. The method as claimed in claim 1, wherein step f) involves replacing the control parameter values in the first set of control parameter values only in case the second RUL deviates with more than a threshold value from the first RUL.

4. The method as claimed in claim 1, comprising, prior to step c):
A) determining a harmonic content of the signal,
B) changing at least one control parameter value in a third set of control parameter values in case an amplitude higher than a threshold value is present in the harmonic content, and
C) repeating steps A)-B) until a set of third control parameter values that causes the amplitude to decrease to a value below the threshold value has been found; and
D) performing steps c-g), wherein the at least one control parameter value that is changed in step c) is of that at least one control parameter that is associated with the at least one control parameter value used in step B), and wherein the change of the at least one control parameter value in step B) is smaller than the change in step c).

5. The method as claimed in claim 4, wherein the changing of the at least one control parameter value in step B) is performed stepwise in each iteration.

6. The method as claimed in claim 4, wherein the changing in step c) is based on the at least one control parameter value selected in step B).

7. The method as claimed in claim 4, wherein in initial iterations of step B) the control parameter value of an individual control parameter is changed, and in later iterations when changes to all individual control parameters have been performed, combinations of control parameter values of control parameters are changed.

8. The method as claimed in claim 4, wherein steps A)-C) form an inner control loop and steps c)-g) form an outer control loop.

9. A non-transitory storage medium encoded with computer code which when executed by processing circuitry of a control system causes the control system to perform the following steps:

a) defining a first set of control parameter values, b) estimating a first value of remaining useful life, RUL, of the rolling-element bearing, based on a signal that provides a measure of vibrations of the rolling-element bearing obtained when the electrical machine is controlled by the first set of control parameter values, c) changing at least one control parameter value in the first set of control parameter values to thereby obtain a second set of control parameter values, d) estimating a second value of RUL of the rolling-element bearing based on the signal, obtained when the electrical machine is controlled by the second set of control parameter values, e) comparing the first value of RUL with the second value of RUL, f) in case the second value of RUL is longer than the first value of RUL, replacing the control parameter values in the first set of control parameter values with those of the second set of control parameter values, and replacing the first value of RUL with the second value of RUL, and g) repeating steps c)-f) during operation of the electrical machine.

10. A control system for extending the lifetime of a rolling-element bearing of an electrical machine, the control system comprising:

a storage medium comprising a computer code, and processing circuitry, wherein when the processing circuitry executes the computer code, the control system is configured to:

a) define a first set of control parameter values, b) estimate a first value of remaining useful life, RUL, of the rolling-element bearing, based on a signal that provides a measure of vibrations of the rolling-element bearing obtained when the electrical machine is controlled by the first set of control parameter values, c) change at least one control parameter value in the first set of control parameter values to thereby obtain a second set of control parameter values, d) estimate a second value of RUL of the rolling-element bearing based on the signal, obtained when the electrical machine is controlled by the second set of control parameter values, e) compare the first value of RUL with the second value of RUL, f) in case the second value of RUL is longer than the first value of RUL, replace the control parameter values in the first set of control parameter values with those of the second set of control parameter values, and replace the first value of RUL with the second value of RUL, and g) repeat steps c)-f) during operation of the electrical machine.

11. The control system as claimed in claim 10, wherein the processing circuitry is configured to estimate the first and second RUL using a degradation model of the rolling-element bearing, using an Extended Kalman Filter or using neural networks.

12. The control system as claimed in claim 10, wherein the processing circuitry is configured to, prior to step c):

A) determine a harmonic content of the signal,

B) change at least one control parameter value in a third set of control parameter values in case an amplitude higher than a threshold value is present in the harmonic content, and C) repeat steps A)-B) until a set of third control parameter values that causes the amplitude to decrease to a value below the threshold value has been found; and D) perform steps c-g), wherein the at least one control parameter value that is changed in step c) is of that at least one control parameter that is associated with the at least one control parameter value used in step B), and wherein the change of the at least one control parameter value in step B) is smaller than the change in step c).

13. The control system as claimed in claim 12, wherein the processing circuitry is configured to change the at least one control parameter value in step B) stepwise in each iteration.

14. The control system as claimed in claim 12, wherein the processing circuitry is configured to perform the change in step c) based on the at least one control parameter value selected in step B).

15. The control system as claimed in claim 12, wherein the processing circuitry is configured to change the control parameter value of an individual control parameter in initial iterations of step B), and in later iterations when changes to all individual control parameters have been performed, to change combinations of control parameter values of control parameters.

\* \* \* \* \*